US008214866B2

(12) United States Patent
Ahn (10) Patent No.: US 8,214,866 B2
(45) Date of Patent: Jul. 3, 2012

(54) VIDEO PROCESSING APPARATUS, MOBILE APPARATUS, AND CONTROL METHOD OF VIDEO PROCESSING APPARATUS

(75) Inventor: Chang-kook Ahn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1128 days.

(21) Appl. No.: 12/060,286

(22) Filed: Apr. 1, 2008

(65) Prior Publication Data

US 2009/0028511 A1    Jan. 29, 2009

(30) Foreign Application Priority Data

Jul. 25, 2007    (KR) .................. 10-2007-0074301

(51) Int. Cl.
*H04N 7/173* (2011.01)

(52) U.S. Cl. ............. 725/93; 725/62; 725/116; 725/146

(58) Field of Classification Search .................... 725/62, 725/80–82, 85, 93, 116, 146, 133, 141, 153; 386/241, 248, 331
See application file for complete search history.

(56) References Cited

U.S. PATENT DOCUMENTS

| 6,427,238 | B1 * | 7/2002 | Goodman et al. | 725/136 |
| 6,912,726 | B1 * | 6/2005 | Chen et al. | 725/113 |
| 7,526,786 | B1 * | 4/2009 | Adams et al. | 725/54 |
| 7,715,436 | B1 * | 5/2010 | Eiriksson et al. | 370/473 |
| 2008/0172303 | A1 * | 7/2008 | Skaaksrud et al. | 705/26 |

FOREIGN PATENT DOCUMENTS

| KR | 10-0440495 B1 | | 7/2004 |
| KR | 10-2006-0069617 | * | 6/2006 |
| KR | 10-2006-0069617 A | | 6/2006 |

* cited by examiner

*Primary Examiner* — Kristine Kincaid
*Assistant Examiner* — Sumaiya A Chowdhury
(74) *Attorney, Agent, or Firm* — Sughrue Mion, PLLC (57) ABSTRACT

A video processing apparatus, a mobile apparatus and a control method of the video processing apparatus are provided. The video processing apparatus includes: a communicating unit which communicates with a video file supplying source that stores a video file and a header file corresponding to the video file, in which the video file contains video information and header information stored behind the video file information and transmitted later than the video information and used for reproducing the video information; a video processing unit which processes the video file to be reproduced; and a controller which receives the header file and the video file from the video file supplying source through the communicating unit and controls the video processing unit to reproduce the video file on the basis of the header file.

20 Claims, 8 Drawing Sheets

VIDEO PROCESSING APPARATUS, MOBILE APPARATUS, AND CONTROL METHOD OF VIDEO PROCESSING APPARATUS

CROSS-REFERENCE TO RELATED APPLICATIONS

This application claims priority from Korean Patent Application No. 10-2007-0074301, filed on Jul. 25, 2007 in the Korean Intellectual Property Office, the disclosure of which is incorporated herein by reference.

BACKGROUND OF THE INVENTION

1. Field of Invention

Apparatuses and methods consistent with the present invention relate to a video processing apparatus, a mobile apparatus and a control method of the video processing apparatus, and more particularly, to a video processing apparatus, a mobile apparatus and a control method of the video processing apparatus, which are capable of receiving a video file from a video file supplying source and reproducing the video file through wireless communication.

2. Description of Related Art

A video processing apparatus such as a television or a set-top box processes and reproduces video files. The video files include video information and a header (hereinafter, referred to as "header information") containing information needed for reproducing the video information. The video processing apparatus reproduces the video file on the basis of the header information. The header information may include a time stamp, codec information, file size, a date, or other information.

The video processing apparatus may receive the video file from a video file supplying source through wireless communication. The video file supplying source may be a personal computer (PC), a notebook computer, a mobile phone, a personal digital assistant (PDA), a digital versatile disc (DVD) player, or the like, which can store and transmit the video file to another device. The wireless communication may be compliant with Bluetooth, wireless universal serial bus (USB), Institute of Electrical and Electronics Engineers (IEEE) 1394, or the like. The video processing apparatus may receive the video file from a mobile apparatus such as a mobile phone or a PDA through Bluetooth communication and reproduce it. For example, among Bluetooth profiles, a video distribution profile (VDP) or a file transfer profile (FTP) may be used to transmit the video file between the video processing apparatus and the mobile apparatus.

The video processing apparatus may perform streaming for the video file. The streaming allows the video processing apparatus to reproduce a video or audio file at the same time when receiving the video or audio file, even though the file is not completely received.

However, in the case that the video processing apparatus receives the video file from the mobile apparatus through Bluetooth communication, a user cannot select files while the video processing apparatus performs streaming for the video file. In other words, the video processing apparatus cannot provide a browsing function to browse and select the video file and a streaming function for the video file simultaneously if Bluetooth communication is used for receiving the video file from the mobile apparatus.

Specifically, the VDP supports streaming functionality, but a user cannot select a desired video file from among the video files stored in the mobile apparatus through the video processing apparatus because the video processing apparatus does nothing but passively receive the video file from the mobile apparatus. On the other hand, in the FTP, a user can selectively receive the video file from the mobile apparatus through the video processing apparatus, but the streaming functionality is not supported. To support the streaming functionality, the header information needs to be transmitted prior to the video information because the video information file is reproduced on the basis of the header information. However, the header information is generally placed at the end of the video information file stored in the mobile apparatus, and thus, the header information is transmitted later than the video information.

SUMMARY OF THE INVENTION

The present invention provides a video processing apparatus, a mobile apparatus and a control method of the video processing apparatus capable of reproducing a video file selected by a user while receiving the video file from a video file supplying source.

The present invention also provides a video processing apparatus, a mobile apparatus and a control method of the video processing apparatus capable of reproducing a partially received video file while receiving the video file if a header file is previously received.

The present invention also provides a video processing apparatus, a mobile apparatus and a control method of the video processing apparatus allowing a user to select a video file from a list of video files stored in a video file supplying source.

According to an aspect of the present invention, there is provided a video processing apparatus including: a communicating unit which communicates with a video file supplying source that stores a video file and a header file corresponding to the video file, wherein the video file contains video information and header information that is stored behind the video file information and transmitted later than the video information and used for reproducing the video information; a video processing unit which processes the video file to be reproduced; and a controller which receives the header file and the video file from the video file supplying source through the communicating unit and controls the video processing unit to reproduce the video file based on the header file.

The controller may request the header file from the video file supplying source through the communicating unit, and receive the header file earlier than the video information file from the video file supplying source.

The controller may control the video processing unit to reproduce the video file which is only partially received based on the header file while receiving the video file.

The video processing apparatus may further comprise a display unit to display a video image processed by the video processing unit, wherein the controller controls the display unit to display a list of video files stored in the video file supplying source.

The video processing apparatus may further comprise an input unit through which a selection of the video file is input, wherein the controller controls the video processing unit to reproduce the video file according to the selection input through the input unit.

The header file may include a time stamp of the video information.

The header file may have a same file name, but may have a different extension, as the video file to be received from the video file supplying source.

The communication unit may communicate with the video file supplying source through a wireless connection.

The communicating unit may wirelessly communicate with the video file supplying source through Bluetooth communication.

The video information may have an Motion Picture Experts Group 4 (MPEG-4) file format.

According to another aspect of the present invention, there is provided a control method of a video processing apparatus, the control method including: receiving a video file and a header file corresponding to the video file from a video file supplying source, wherein the video file contains video information and header information that is stored behind the video information and transmitted later than the video information and used for reproducing the video information; and reproducing the video file based on the received header file.

The receiving of the video file and the header file may comprise requesting the header file from the video file supplying source, and receiving the header file earlier than the video file from the video file supplying source.

The reproducing the video file may comprise reproducing the video file which is only partially received based on the header file while receiving the video file.

The control method may further comprise receiving and displaying a list of video files stored in the video file supplying source.

The receiving the video file and the header file may comprise receiving the video file according to a user's selection and the header file corresponding to the selected video file.

The header file may include a time stamp of the video information.

The header file may have a same file name, but may have a different extension, as the video file to be received from the video file supplying source.

The reception of the video file and the header file may comprise wirelessly receiving the video file and the header file from the video file supplying source.

The reception of the video file and the header file may comprise receiving the video file and the header file from the video file supplying source through Bluetooth communication.

The video information has an Motion Picture Experts Group 4 (MPEG-4) file format.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE PRESENT INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

Figure 1:
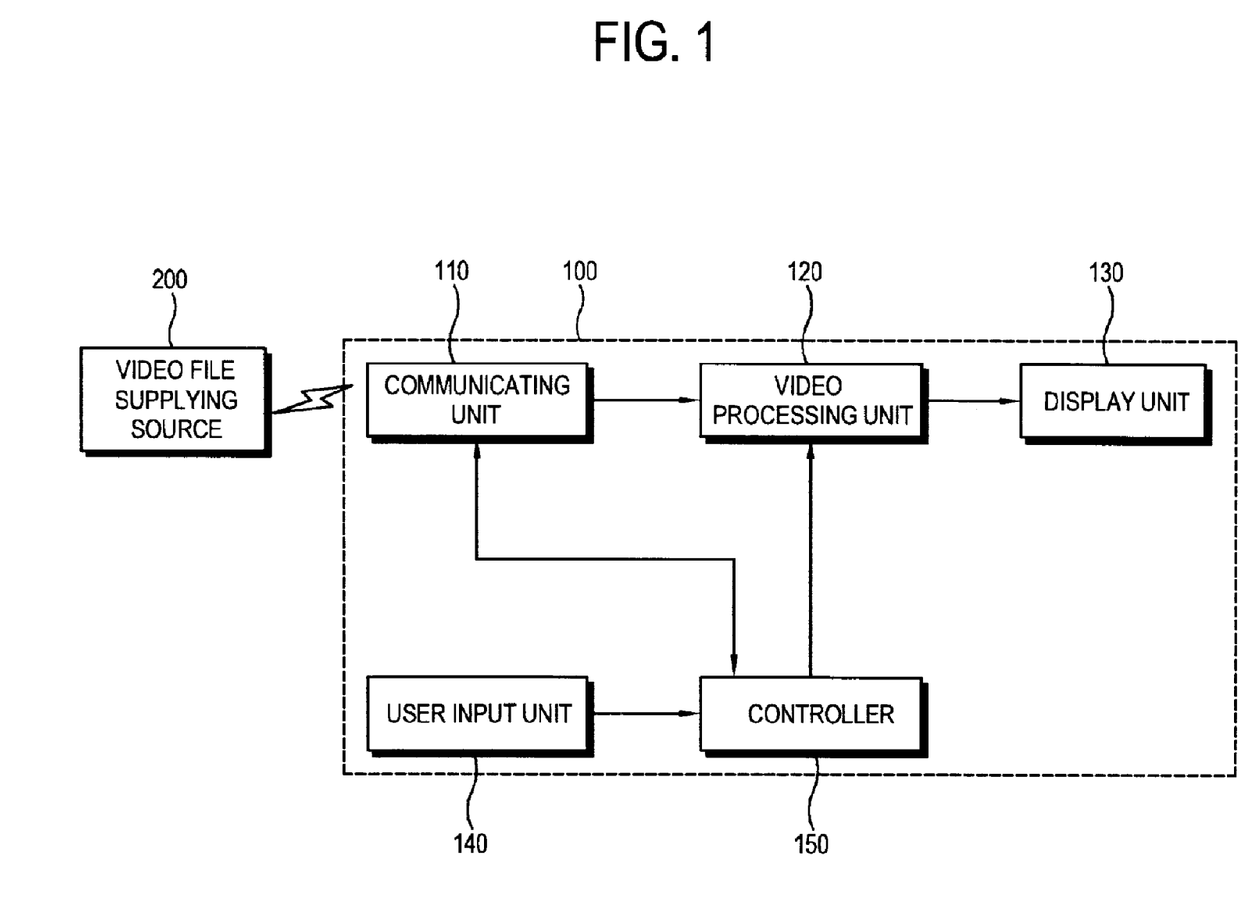
FIG. 1 is a block diagram of a video processing apparatus according to an exemplary embodiment of the present invention.

FIG. 1 is a block diagram of a video processing apparatus 100 according to an exemplary embodiment of the present invention. The video processing apparatus 100 receives a video file from a video file supplying source 200 through wireless communication and reproduces it. For example, the video processing apparatus 100 may be provided as a television, a set-top box, or the like and perform streaming for the video file while receiving the video file from a mobile apparatus such as a mobile phone, a PDA, or the like through Bluetooth communication.

As shown in FIG. 1, the video processing apparatus 100 includes a communicating unit 110, a video processing unit 120, a display unit 130, a user input unit 140, and a controller 150.

The communicating unit 110 wirelessly communicates with the video file supplying source 200. For example, the communicating unit 110 wirelessly communicates with the video file supplying source 200 through Bluetooth communication. Bluetooth is an industrial specification for wireless communication between devices such as computers, mobile phones, home appliances, and the like within a short range.

The video file supplying source 200 is used for storing and transmitting the video file. In more detail, the video file and a header file corresponding to the video file are separately stored in the video file supplying source 200. The video file includes video information and header information, in which the header information follows the video information. The header file is a supplemental file obtained by parsing the header information from the video file. That is, the header file is provided for reproducing the video file. The header file may include at least one of a time stamp, codec information, file size, a date, or other information. It may be preferable, but not necessary, that the header file has the same name as the video file to thereby allow a user to easily find and receive the header file.

The video processing unit 120 processes the video file to be reproduced. The video file may be encoded by MPEG, Digital Video Express (DivX), Advanced Streaming Format (ASF), Windows Media Video (WMV), or the like. For example, the video file of the present embodiment uses an MPEG-4 file format. That is, the video file supplying source 200 stores the video file having the MPEG-4 file format. Here, MPEG-4 is a standard for video compression, designed to reduce the quantity of data while retaining as much of the original quality as possible. On this account, the mobile apparatus such as a mobile phone or the like, which has a relatively small-capacity memory, generally stores the video file as the MPEG-4 file format.

The display unit 130 displays an image processed by the video processing unit 120. The display unit 130 may include a cathode ray tube (CRT), a liquid crystal display (LCD), a plasma display panel (PDP), etc.

The user input unit 140 is provided to input a user's selection. For example, the user input unit 140 may be provided as a remote controller, a control button provided in the television, or the like. The user's selection is sent to the controller 150 through the user input unit 140.

The controller 150 receives the header file and the video file from the video file supplying source 200 through the communicating unit 110, and controls the video processing unit 120 to reproduce the video file on the basis of the received header file. The controller 150 requests the header file from the video file supplying source 120 through the communicating unit 110, and receives the header file earlier than the video file from the video file supplying source 200 so as to reproduce the video file on the basis of the header file while receiving the video file. Further, the controller 150 may control the video processing unit 120 to reproduce a partially received video file on the basis of the header file while receiving the video file. In this way, the video processing apparatus 100 can perform streaming for the video file.

The controller 150 may control a list of video files stored in the video file supplying source 200 to be displayed on the display unit 130. Also, the controller 150 may control the video processing unit 120 to reproduce a video file, selected by a user through the user input unit 140, among the video files. Thus, a user of the video processing apparatus 100 can browse and select the video file stored in the video file supplying source 200.

Figure 2:
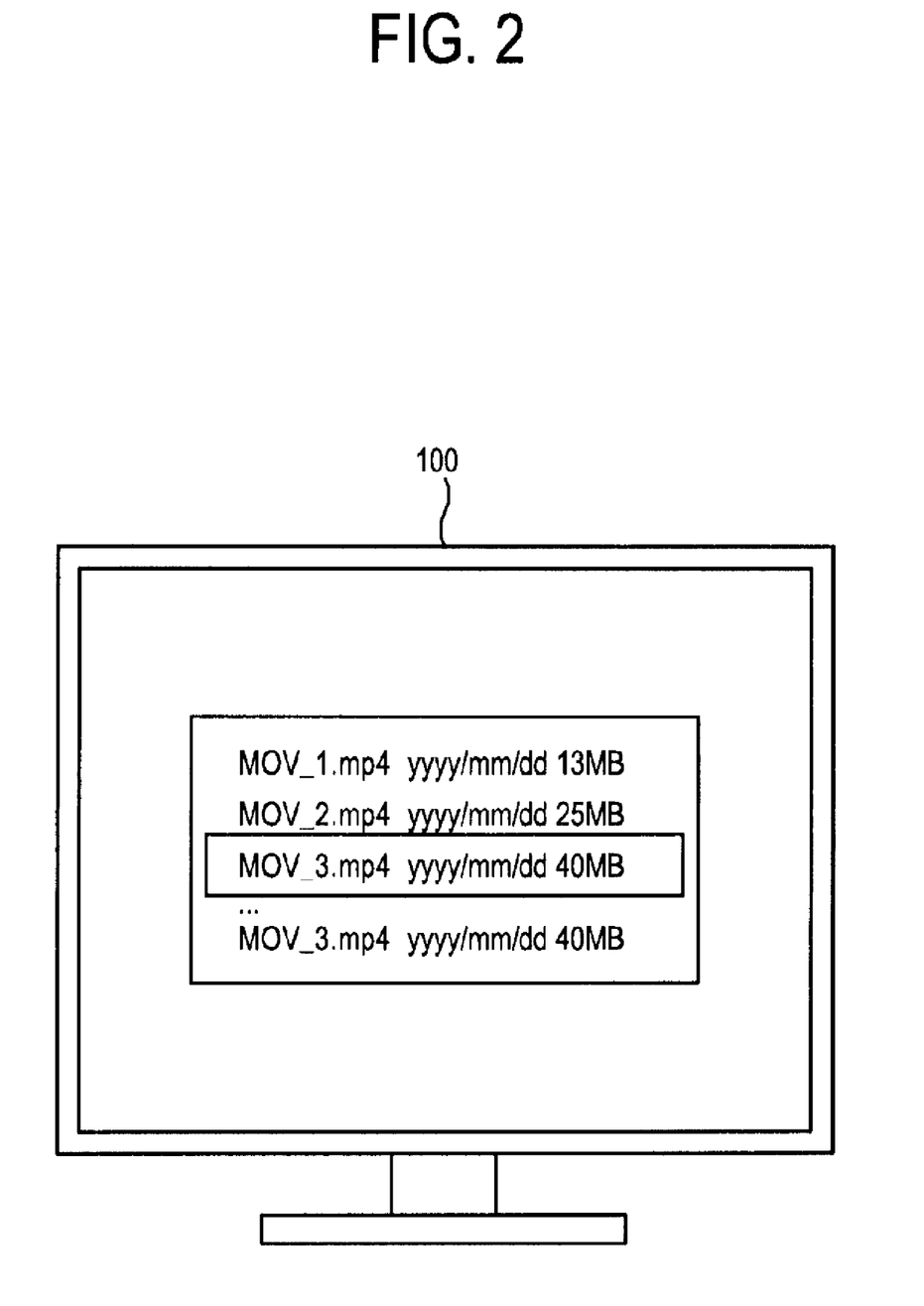
FIGS. 2, 3 and 4 illustrate operations of the video processing apparatus according to another exemplary embodiment of the present invention.
Figure 3:
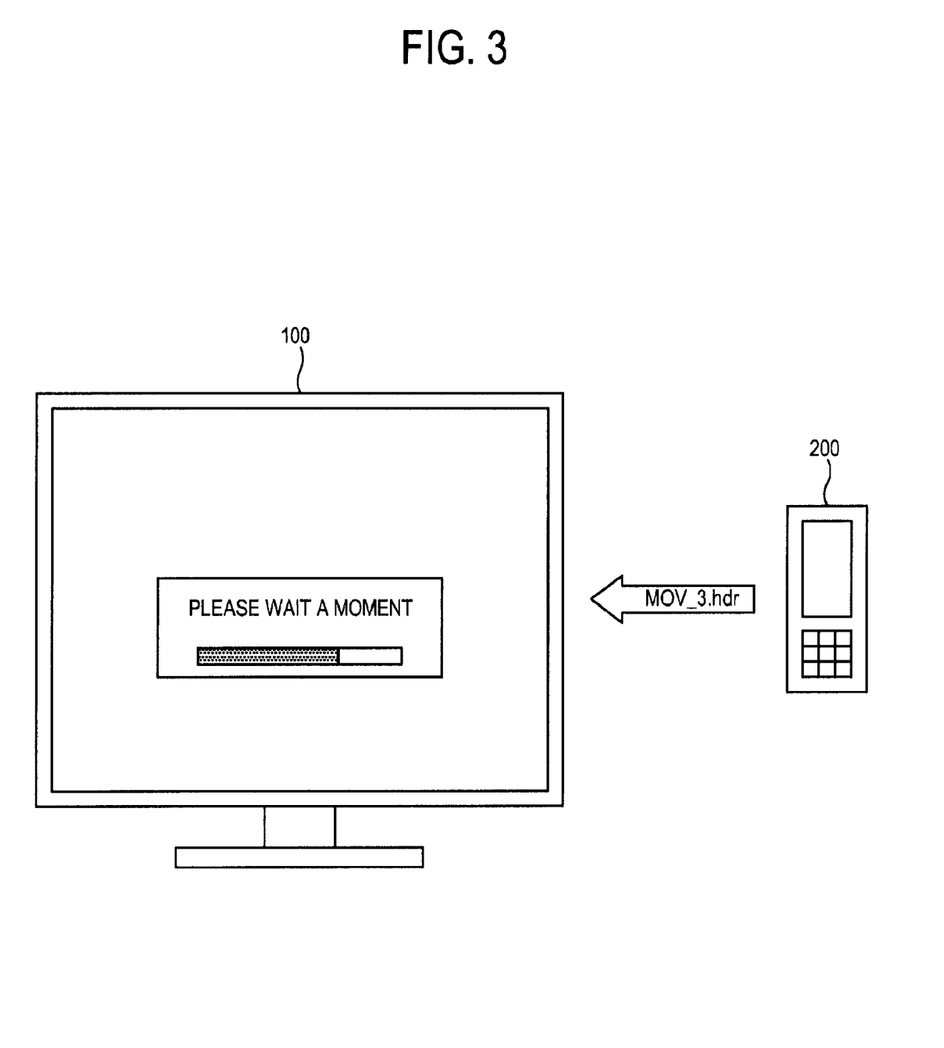
Figure 4:
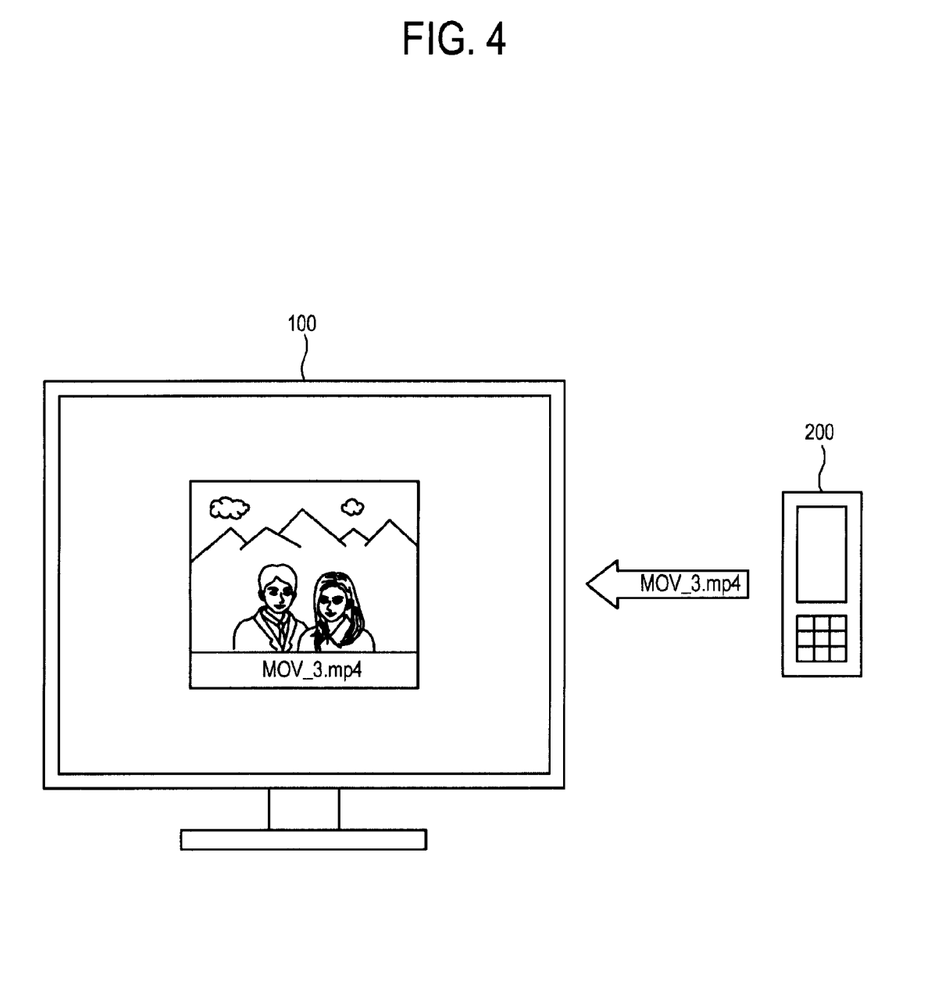

For instance, a television as an example of the video processing apparatus 100 connects with a mobile phone as an example of the video file supplying source 200 through the Bluetooth FTP (refer to FIG. 3). As shown in FIG. 2, the television 100 displays the list of video files stored in the mobile phone 200 on a screen thereof. When a user selects a certain video file through the user input unit 140, the television 100 makes a request to the mobile phone 200 for the header file having the same name as the selected video file. As shown in FIG. 3, while the header file is transmitted from the mobile phone 200, the television 100 indicates that transmission of the video information file is in preparation. When the header file is completely transmitted, the television 100 begins to receive the video file. Then, as shown in FIG. 4, the television 100 reproduces the partially received video file on the basis of the header file.

Figure 5:
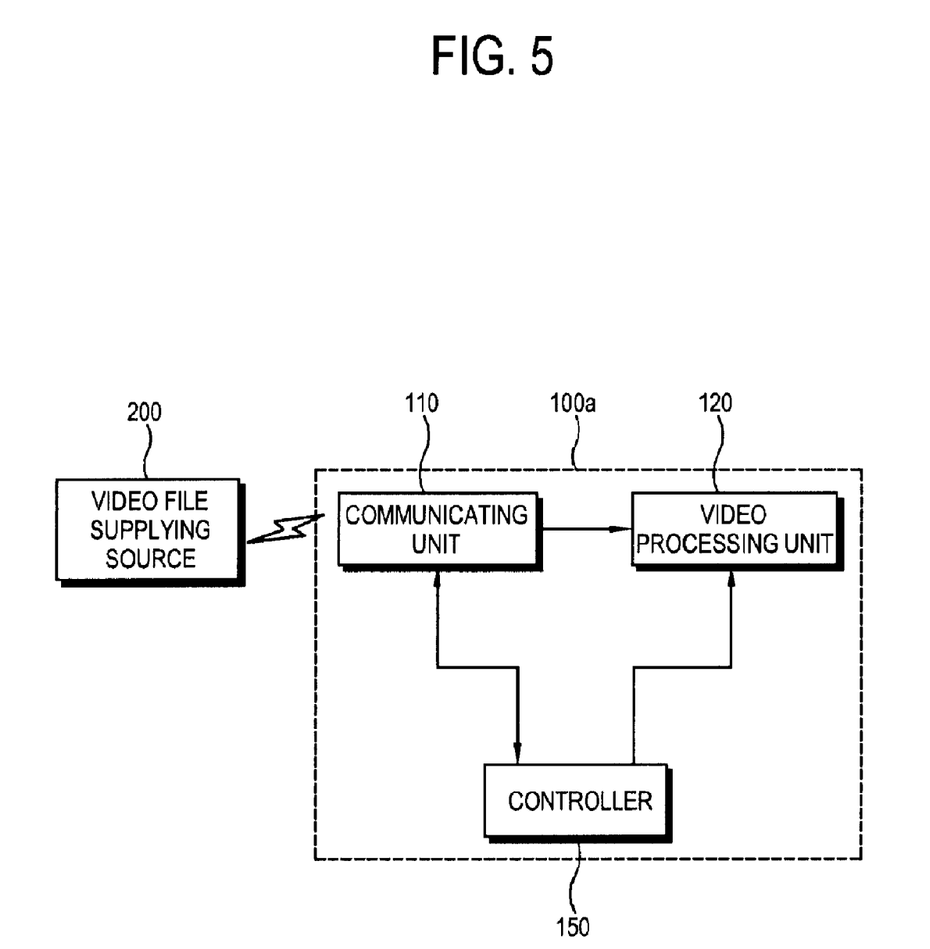
FIG. 5 is a block diagram of a video processing apparatus according to an exemplary embodiment of the present invention.

FIG. 5 is a block diagram of a video processing apparatus 100a according to another exemplary embodiment of the present invention. As shown in FIG. 5, the video processing apparatus 100a includes a communicating unit 110, a video processing unit 120, and a controller 150. Descriptions of the video processing apparatus 100a according to this embodiment will be omitted because the elements 110, 120 and 150 of the video processing apparatus 100a are the same as those of the video processing apparatus 100 described in FIG. 1.

Figure 6:
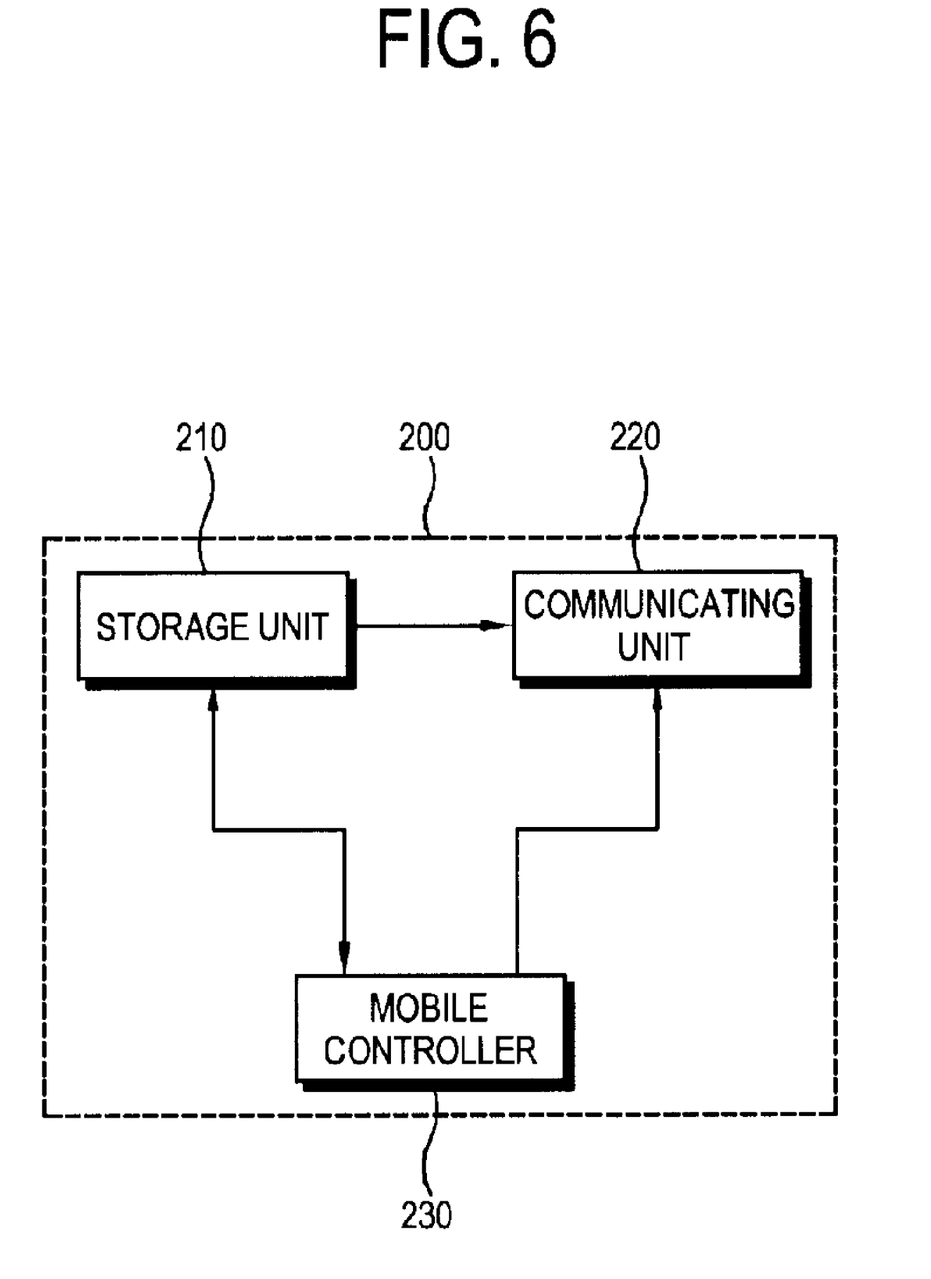
FIG. 6 is a block diagram of a video file supplying source according to an exemplary embodiment of the present invention.

FIG. 6 is a block diagram of the video file supplying source 200 according to an exemplary embodiment of the present invention.

As shown in FIG. 6, the video file supplying source (hereinafter, referred to as a "mobile apparatus") 200 includes a storage unit 210, a communicating unit 220, and a mobile controller 230.

The storage unit 210 stores data of the mobile apparatus 200. The communicating unit 220 transmits and receives data through Bluetooth communication.

Figure 7:
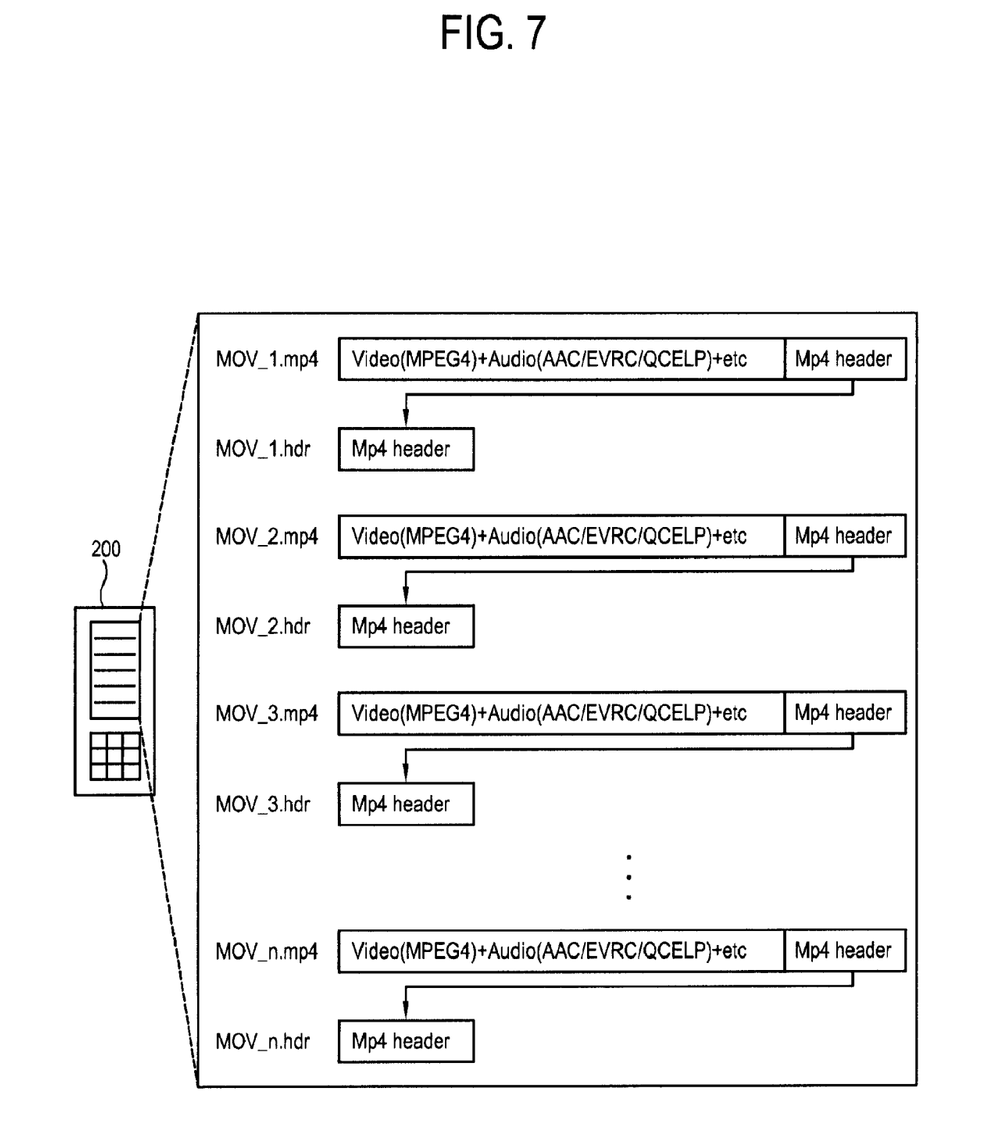
FIG. 7 illustrates an operation of the video file supplying source according to an exemplary embodiment of the present invention.

In the case that the storage unit 210 stores the video file, the mobile controller 230 controls a header file corresponding to the video file to be separately stored in the storage unit 210. As shown in FIG. 7, the mobile phone 200 stores a plurality of video files and a plurality of header files each corresponding to the plurality of video files. Meanwhile, it is preferable, but not necessary, that the video file and the corresponding header file have the same file name. For example, the mobile phone 200 creates the video file based on video information taken by a camera (not shown), and stores it in the storage unit 210 while storing header information of the video file as the header file separately.

Figure 8:
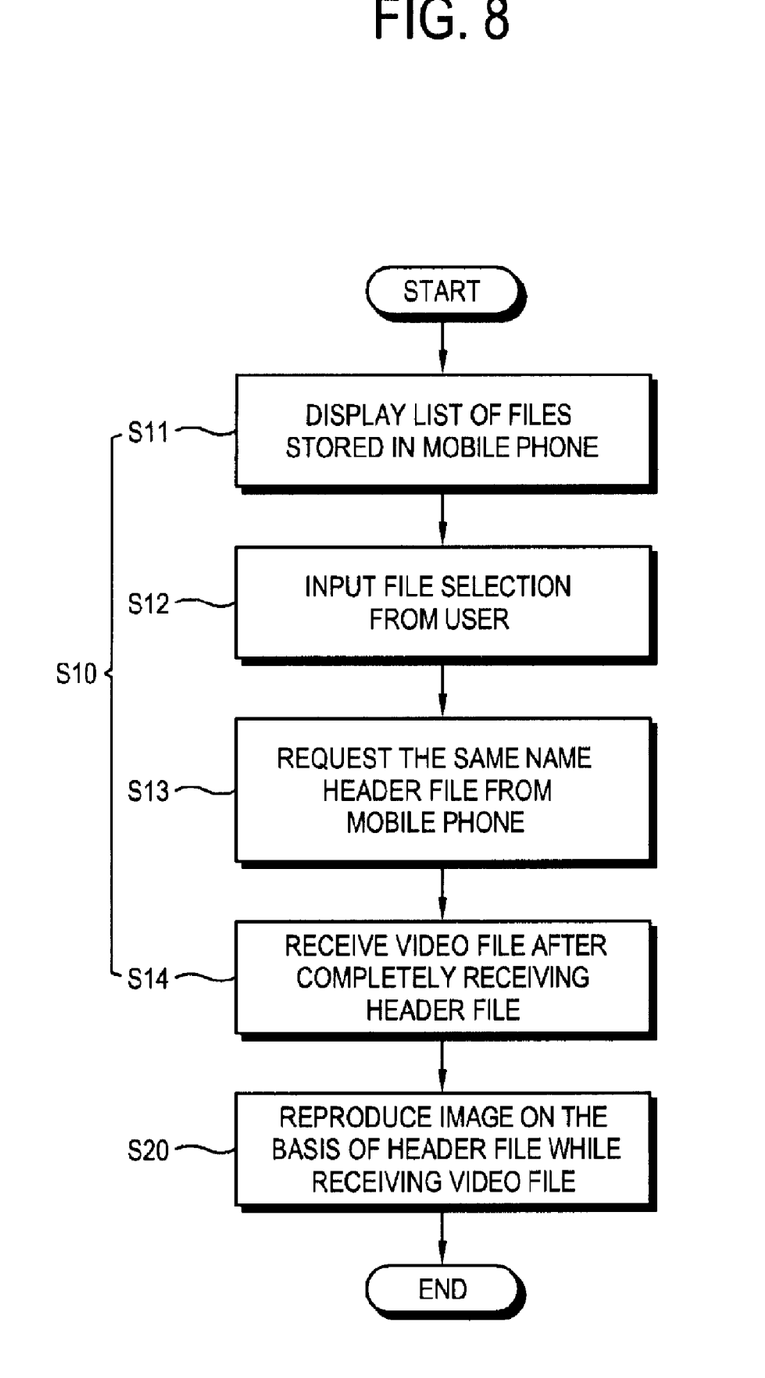
FIG. 8 is a flowchart of a control method of the video processing apparatus according to an exemplary embodiment of the present invention.

A control method of the video processing apparatus 100 according to an exemplary embodiment of the present invention will be described with reference to FIG. 8.

At operation S10, the video processing apparatus 100 receives the video file and the header file corresponding to the video file from the video file supplying source 200. Here, the video file contains the video information and the header information transmitted later than the video information and used in reproducing the video information.

At operation S20, the video processing apparatus 100 reproduces the video file on the basis of the received header file while receiving the video file.

Operation S10 may include operations S11, S12, S13 and S14. At operation S11, the video processing apparatus 100 displays the list of video files stored in the mobile phone 200. The controller 150 may control the display unit 130 to display the list of video files stored in the video file supplying source 200. For example, the television 100 displays the list of video files stored in the mobile phone 200.

At operation S12, the video processing apparatus 100 receives information about the video file which is selected by a user. At operation S13, the video processing apparatus 100 requests the header file having the same name as the video file selected from the mobile phone 200. For example, the television 100 requests the mobile phone 200 to transmit the header file having the same name as the selected video file in response to a user's video file selection. At this time, the mobile phone 200 transfers the header file corresponding to the selected video file.

At operation S14, the video processing apparatus 100 receives the video file after completely receiving the header file. As shown in FIG. 3, while the header file is transmitted from the mobile phone 200, the television 100 indicates that transmission of the video file is in preparation. Then, when the header file is completely transmitted, the television 100 requests the video file from the mobile phone 200 and begins to receive the video file.

Then, at operation S20, the video processing apparatus 100 reproduces a video image on the basis of the previously received header file while receiving the video file. As shown in FIG. 4, as soon as a part of the video file is received, the television 100 reproduces the received part of the video file on the basis of the header file.

As described above, the exemplary embodiments of the present invention provide a video processing apparatus, a mobile apparatus and a control method of the video processing apparatus capable of reproducing a video file selected by a user while receiving the video file from a video file supplying source.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:
   a communicating unit which communicates with a video file supplying source that separately stores a video file and a header file corresponding to the video file, wherein the video file contains video information and header information that is stored behind the video information and transmitted later than the video information and used for reproducing the video information, and the separately stored header file is a supplemental file obtained by parsing the header information of the video file;
a video processing unit which processes the video file to be reproduced; and
a controller which receives the header file and the video file from the video file supplying source through the communicating unit and controls the video processing unit to reproduce the video file based on the header file.

2. The video processing apparatus according to claim 1, wherein the controller requests the header file from the video file supplying source through the communicating unit, and receives the header file earlier than the video file from the video file supplying source.

3. The video processing apparatus according to claim 1, wherein the controller controls the video processing unit to reproduce the video file which is only partially received based on the header file while receiving the video file.

4. The video processing apparatus according to claim 1, further comprising a display unit to display a video image processed by the video processing unit,
wherein the controller controls the display unit to display a list of video files stored in the video file supplying source.

5. The video processing apparatus according to claim 1, further comprising an input unit through which a selection of the video file is input,
wherein the controller controls the video processing unit to reproduce the video file according to the selection input through the input unit.

6. The video processing apparatus according to claim 1, wherein the header file includes a time stamp of the video information.

7. The video processing apparatus according to claim 1, wherein the header file has a same file name as the video file to be received from the video file supplying source, and
wherein the header file has a different extension from the video file to be received from the video file supplying source.

8. The video processing apparatus according to claim 1, wherein the communication unit communicates with the video file supplying source through a wireless connection.

9. The video processing apparatus according to claim 8, wherein the communicating unit wirelessly communicates with the video file supplying source through Bluetooth communication.

10. The video processing apparatus according to claim 1, wherein the video information has an Motion Picture Experts Group 4 (MPEG-4) file format.

11. A control method of a video processing apparatus, the control method comprising:
receiving a video file and a header file corresponding to the video file from a video file supplying source, wherein the video file contains video information and header information that is stored behind the video information and transmitted later than the video information and used for reproducing the video information and the video file and the header file are separately stored in the video file supplying source and the separately stored header file is a supplemental file obtained by parsing the header information of the video file; and
reproducing the video file based on the received header file.

12. The control method according to claim 11, wherein the receiving of the video file and the header file comprises requesting the header file from the video file supplying source, and receiving the header file earlier than the video file from the video file supplying source.

13. The control method according to claim 11, wherein the reproducing the video file comprises reproducing the video file which is only partially received based on the header file while receiving the video file.

14. The control method according to claim 11, further comprising receiving and displaying a list of video files stored in the video file supplying source.

15. The control method according to claim 11, wherein the receiving the video file and the header file comprises receiving the video file according to a user's selection and the header file corresponding to the selected video file.

16. The control method according to claim 11, wherein the header file includes a time stamp of the video information.

17. The control method according to claim 11, wherein the header file has a same file name as the video file to be received from the video file supplying source, and
wherein the header file has a different extension from the video file to be received from the video file supplying source.

18. The control method according to claim 11, wherein the reception of the video file and the header file comprises wirelessly receiving the video file and the header file from the video file supplying source.

19. The control method according to claim 18, wherein the reception of the video file and the header file comprises receiving the video file and the header file from the video file supplying source through Bluetooth communication.

20. The control method according to claim 11, wherein the video information has an Motion Picture Experts Group 4 (MPEG-4) file format.

* * * * *